3,694,353
EXTENDED AERATION WASTEWATER
TREATMENT
Jen T. Yang and Robert Waller, Columbia, and Charles
W. Mallory, Severna Park, Md., assignors to Hittman
Associates, Inc., Columbia, Md.
Continuation-in-part of application Ser. No. 98,843,
Dec. 16, 1970. This application Nov. 3, 1971,
Ser. No. 195,389
Int. Cl. C02c 1/12
U.S. Cl. 210—7
28 Claims

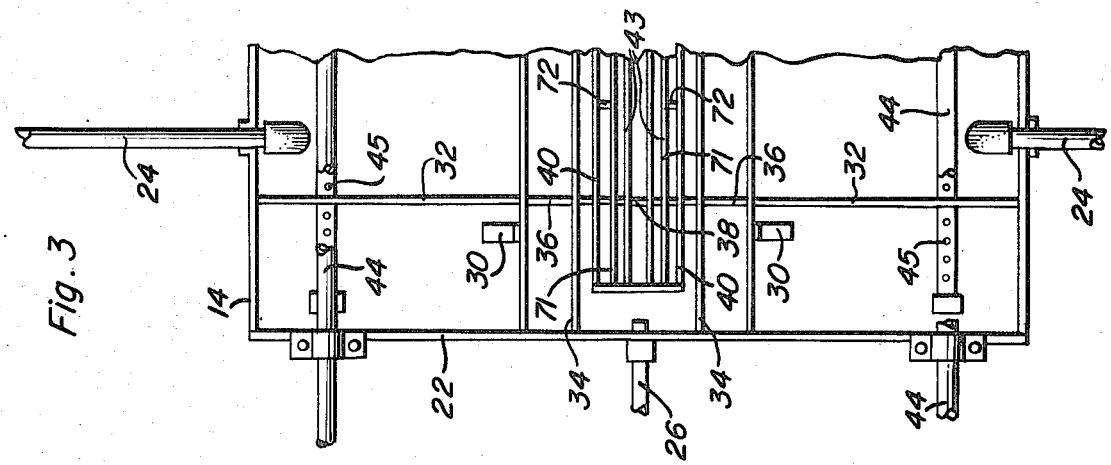
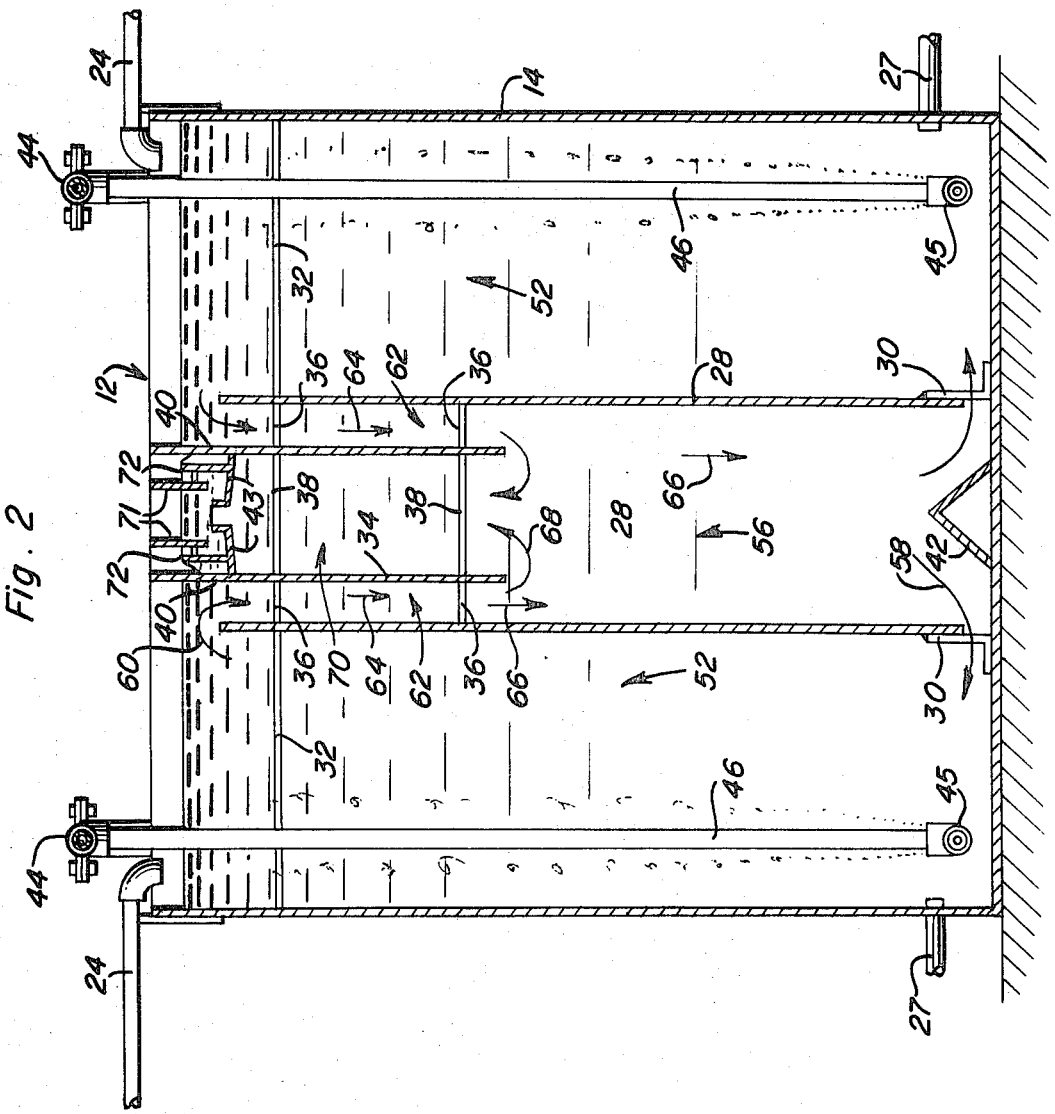

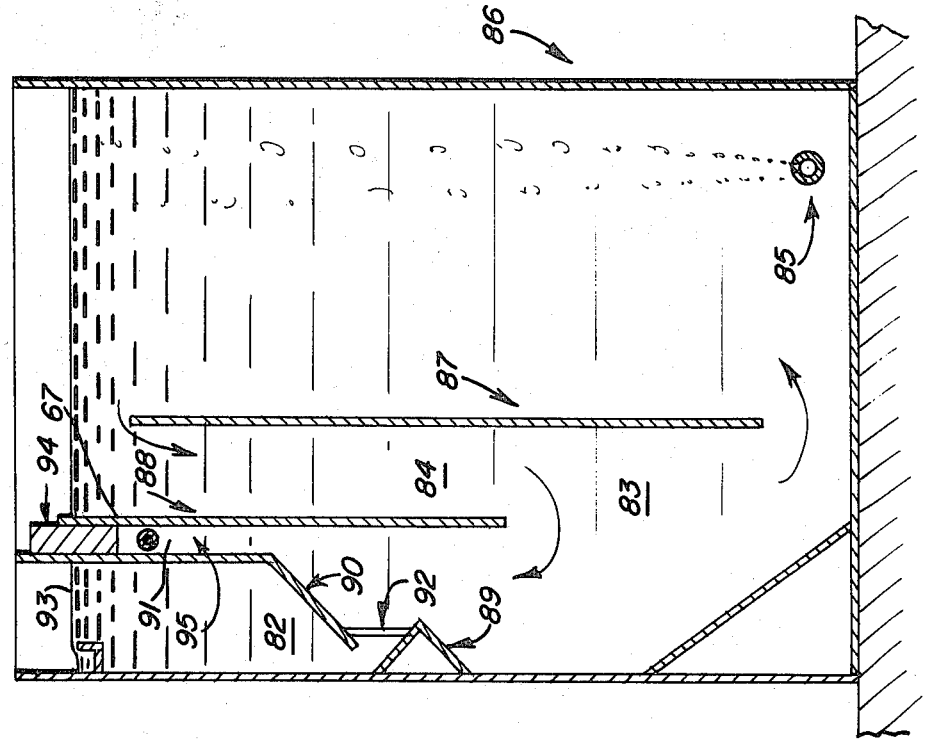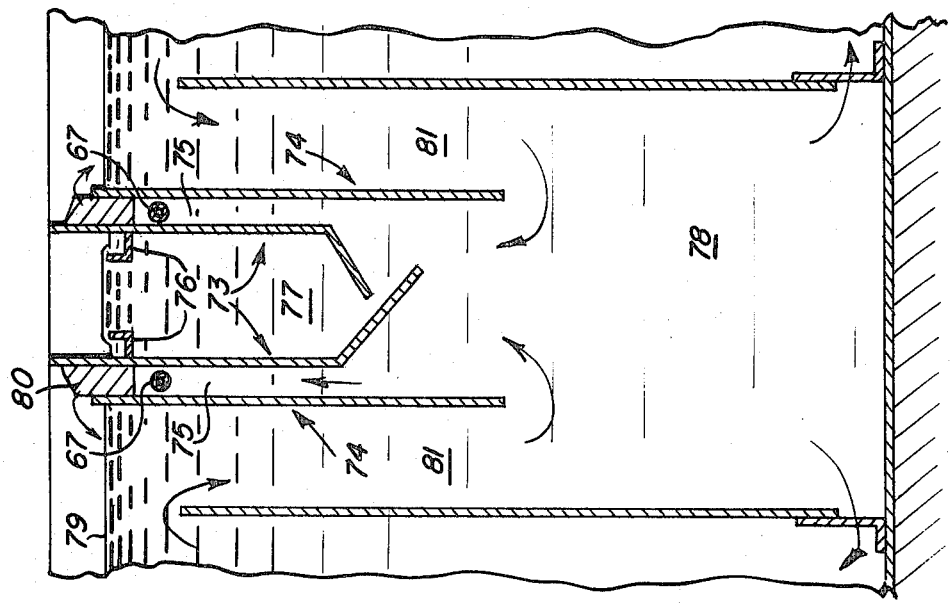

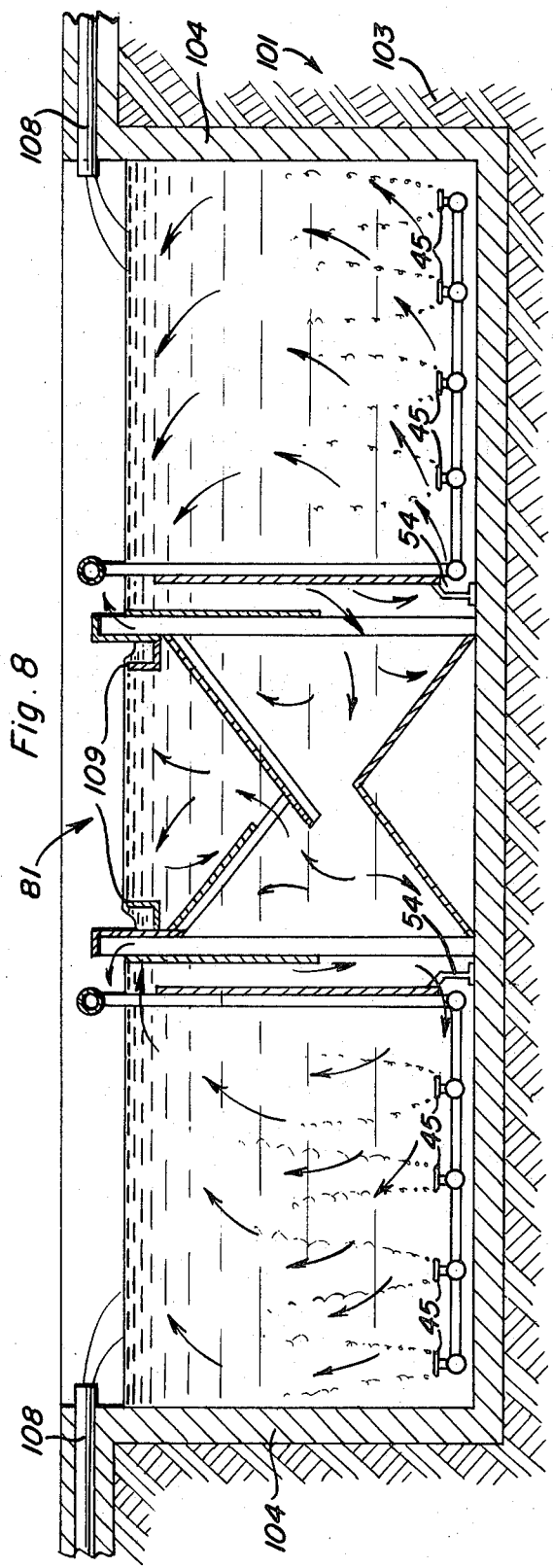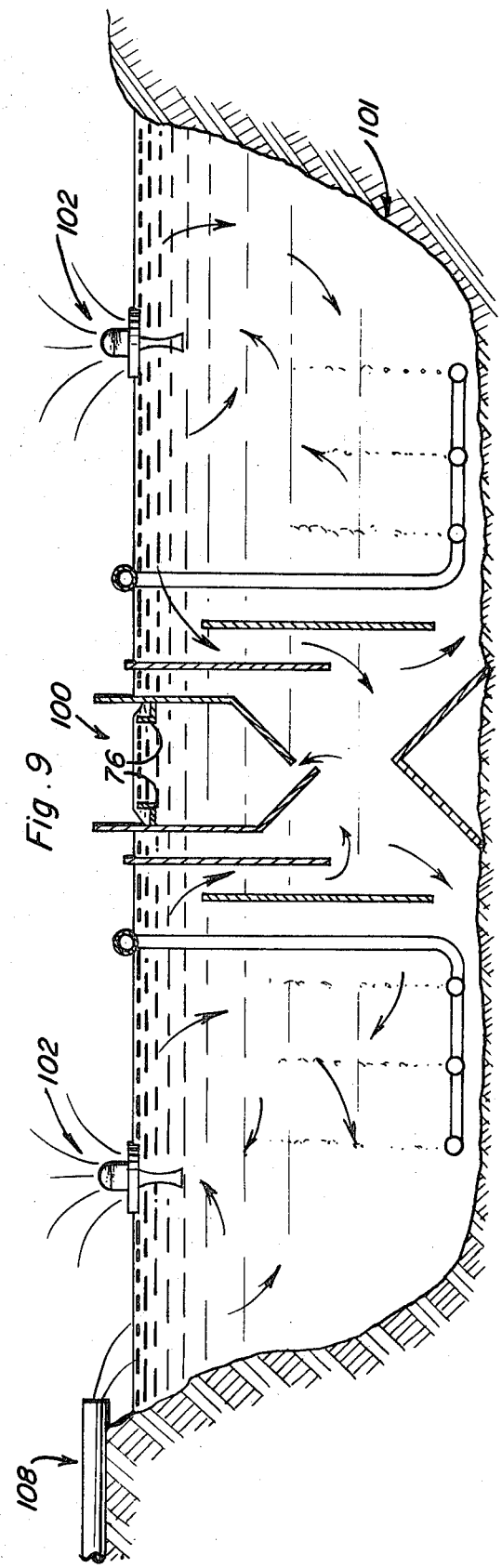

ABSTRACT OF THE DISCLOSURE

An improved extended aeration process is carried out in a single tank. Wastes are aerated for periods ranging from 12 to 24 hours and are circulated in the tank in a controlled manner to avoid settling and compaction. The concentration of mixed liquor is maintained by the selective removal of clarified effluent. In this manner, the necessity for providing quiescent zones for the settling of solids and for returning compacted sludge to the aeration process is eliminated. The inventive apparatus is of modular construction, avoids the problems associated with sludge compaction and in the preferred form is capable of being fabricated from planer elements either as a complete unit or internals for installation in other types of tankage.

CROSS-REFERENCE TO RELATED APPLICATION

This application is a continuation-in-part application of application Ser. No. 98,843, filed Dec. 16, 1970, and now abandoned.

BACKGROUND OF THE INVENTION

This invention relates to a biological waste treatment process.

In particular, this invention relates to an extended aeration biological waste treatment process and an apparatus for carrying out such a process.

As is known, waste sewage contains objectionable organic matter which may be biodegraded and thus rendered harmless by various oxygen consuming, or aerobic, bacteria. The "activated sludge" process is a method developed to speed the bio-chemical degradation of waste sewage by taking advantage of this phenomenon. In this process an amount of aerobic bacteria, usually in the form of agglomerates of particulate bacteria, is mixed with the incoming raw sewage and the composition contacted with oxygen. The aerobic bacteria consume the organic matter in the sewage and produce carbon dioxide, which is vented to the atmosphere. Additionally, new aerobic bacteria are produced within the bacteria agglomerates suspended in the waste water undergoing treatment. After a suitable aeration period, this composition of sewage and bacteria, referred to as mixed liquor, is allowed to settle so that the particulate aerobic bacteria, or sludge, are separated out and a purified effluent is produced. The purified effluent is discharged, while the settled aerobic bacteria, referred to as "settled sludge," is returned to the process system or disposed of in a conventional manner.

The activated sludge process is typically carried out by introducing raw sewage and an amount of aerobic bacteria into a first aeration tank where the mixture is contacted with air until the organic matter is biodegraded, usually about 6 to 8 hours. The mixed liquor is then transferred to a clarifier or settler where the particulate aerobic bacteria settle to the bottom to form settled sludge, and the clarified effluent product is withdrawn from the top. Because the settled sludge is itself composed of aerobic bacteria, it is recycled to the raw sewage inlet stream to provide the proper aerobic bacteria concentration for the process. However, because more settled sludge is collected in the clarifier or settler than is needed to react with the incoming raw waste, only about 25 to 50% of the sludge is recycled. The remaining 75 to 50% of the sludge must be disposed of in a conventional manner, which is normally quite complex and costly.

In order to reduce this cost, the final clarifiers or settlers in conventional activated sludge plants are usually designed not only to settle the suspended solids, but also to compact the sludge so that the capital expenses for the waste sludge treatment are minimized. Thus, the clarifiers are normally designed with particular internal geometries and are usually equipped with some type of mechanical thickening device to compact the sludge before it is discharged. While the initial capital outlay for such clarifiers is greater, the use of such clarifiers represents an over all savings, since the pumping costs for recycling the sludge are less and the cost of disposing of waste sludge is also less.

Activated sludge processes using compacting clarifiers have found great utility in large capacity waste treatment plants. However, such processes have proved to be very costly in lower capacity plants, or plants having a maximum waste treating capacity of less than about one million gallons per day. Because the ratio of the organic material to aerobic bacteria, or the "food to microorganism" ratio, in the aeration tank must be maintained within relatively narrow limits, the sludge recycle ratio must also be maintained within narrow limits. Thus, it is necessary to hire skilled personnel to monitor the flow rate of incoming raw wastes and monitor and control the flow rate of the sludge recycle so that the proper recycle ratio is maintained.

Recently, another waste treatment process has been developed to overcome these drawbacks. This process, referred to as the "extended aeration" process is based on the fact that in the presence of enough oxygen and the absence of an excess of organic material, the aerobic bacteria become self-consuming, a process known as "endogenous respiration." In the extended aeration process, raw sewage is contacted with enough aerobic bacteria so that the food to microorganism ratio is such that the rate of new sludge production is approximately equal to the rate of endogenous respiration. This process requires the much longer aeration period of 12 to 24 hours, after which the mixed liquor is clarified. Because so much more of the sludge is consumed by this process, all of the activated sludge withdrawn from the clarifier is recycled to the raw sewage inlet stream. This, of course, eliminates the need to continuously dispose of excess waste sludge and thus represents a substantial savings over the activated sludge process. However, because new aerobic bacteria are continually being produced and destroyed, small amounts of inorganic waste products from the decomposition of the bacteria are continually produced. Because these inorganic waste products are simply recycled over and over again, they tend to accumulate, and so part of the settled sludge is occasionally wasted instead of being recycled. However, because the production of the inorganic wastes in the extended aeration process is much less than the production of excess waste sludge in the activated sludge process, the capital and operating expense of removing waste in this process is much less than the cost of removing sludge in the activated sludge process.

While the extended aeration process has eliminated some of the costs inherent in the activated sludge process, it is still relatively expensive. In the conventional extended aeration process plant, not only are separate aeration and settling tanks commonly employed but also various compacting and pumping means are used to compact the sludge collected at the bottom of the separator and return it to the raw sewage input stream.

Moreover, because of the wide variations in raw waste input flow rates experienced by the smaller extended aeration plants, the clarifier sections of the plants are usually built to handle flow rates of up to almost 6 times average daily expected flow rates. This gives rise to a specific problem during off-peak hours, since if sludge is not rapidly removed from the compaction zone of the clarifier, the compacted sludge turns septic. This occurs because the bacteria contained in the sludge in the absence of available dissolved oxygen reduce the nitrate ion in the treated waste to nitrogen gas. Bubbles of nitrogen lift sludge particles from the compaction zone to form a scummy residue, which floats on the clarifier liquid surface to be carried with the final effluent. Sludge lifting is a major problem in the operation of conventional extended aeration plants and is a frequent cause of poor plant performance.

Accordingly, it is the main object of the present invention to provide a simplified, efficient and economical process and apparatus for the treatment of wastewater.

Another object of the present invention is to provide an apparatus for treating wastewater which is smaller in size and simpler in design than conventional apparatus with equal detention times for biodegradation, thus reducing the cost of fabrication.

Yet another object of the present invention is to provide a novel wastewater treatment process and plant wherein no mechanical equipment is needed for sludge return, therefore decreasing costs and maintenance problems.

It is a further object of the present invention to provide a novel process and apparatus for the treatment of wastewater wherein the detention time for the mixed liquor in the clarifier zone is shortened, thus overcoming the severe operational problems due to septic sludge lifting.

Another object of the present invention is to provide a novel wastewater treatment process and plant wherein no mechanical equipment is needed for scum removal, therefore, decreasing cost and maintenance problems.

Yet another object of the present invention is to provide a novel process and apparatus for the treatment of wastewater in which the compaction of sludge is eliminated, thus reducing problems involved in sludge septicity, and the cost and maintenance problems associated with compacting sludge.

Still another object of this invention is to provide a means by which the extended aeration process can be economically applied to large capacity waste water treatment plants.

SUMMARY OF THE INVENTION

These and other objects are accomplished according to the present invention wherein an improved extended aeration wastewater treatment process is substantially carried out in a single chamber or tank in which are securely positioned a number of planar baffles defining, in the single chamber, an aeration zone, a mixed liquor return zone and a clarifier zone. A compressed air source is located in a lower portion of the aeration zone to provide the entire pumping action of the system, including a 100% recycle of mixed liquor. The location of the baffles and the flow rate of the compressed air are selected so that the mixed liquor vigorously recirculates through the tank at a minimum velocity at least 10 times the settling velocity of the sludge particles. The rapid mixed liquor flow rate prevents sludge compaction and sludge settling inherent in prior art extended aeration processes and thereby minimizes the capital expenses of building extended aeration plants. Moreover, the rapid mixed liquor flow rate also insures that oxygen is always available to the bacteria, even when the sludge is not in an aeration zone. This not only prevents the sludge from becoming septic, but also enables the volume of the aeration zone to be minimized.

The entire apparatus in which the process is carried out is composed of a system of planar baffles, and as a result, the entire device is of simple construction and therefore relatively inexpensive. Moreover, because of its simplicity, the apparatus can be constructed in modular units in a factory and the necessary number of units merely transported to the plant site for easy assembly. Furthermore, because of the unique design of the baffle system and the location of the aerators, the baffle system and aerators can be placed in any sized or shaped tank or lagoon to produce an efficient extended aeration wastewater plant.

BRIEF DESCRIPTION OF THE DRAWINGS

The nature of the present invention may be better understood by reference to the following drawings wherein:

FIG. 2 is a cross-section taken along line 2—2 of FIG. 1;

FIG. 3 is an enlarged top view of a portion of the inventive apparatus;

FIG. 4 is a cross-section similar to FIG. 2 showing a modification;

FIG. 5 is a cross-section similar to FIG. 2 showing a further modification;

FIG. 8 is a cross-sectional view illustrating the use of the internal components of FIG. 7 in a pre-existing tank; and FIG. 9 illustrates the use of the internal components of FIG. 7 in a lagoon.

DETAILED DESCRIPTION

Figure 1:
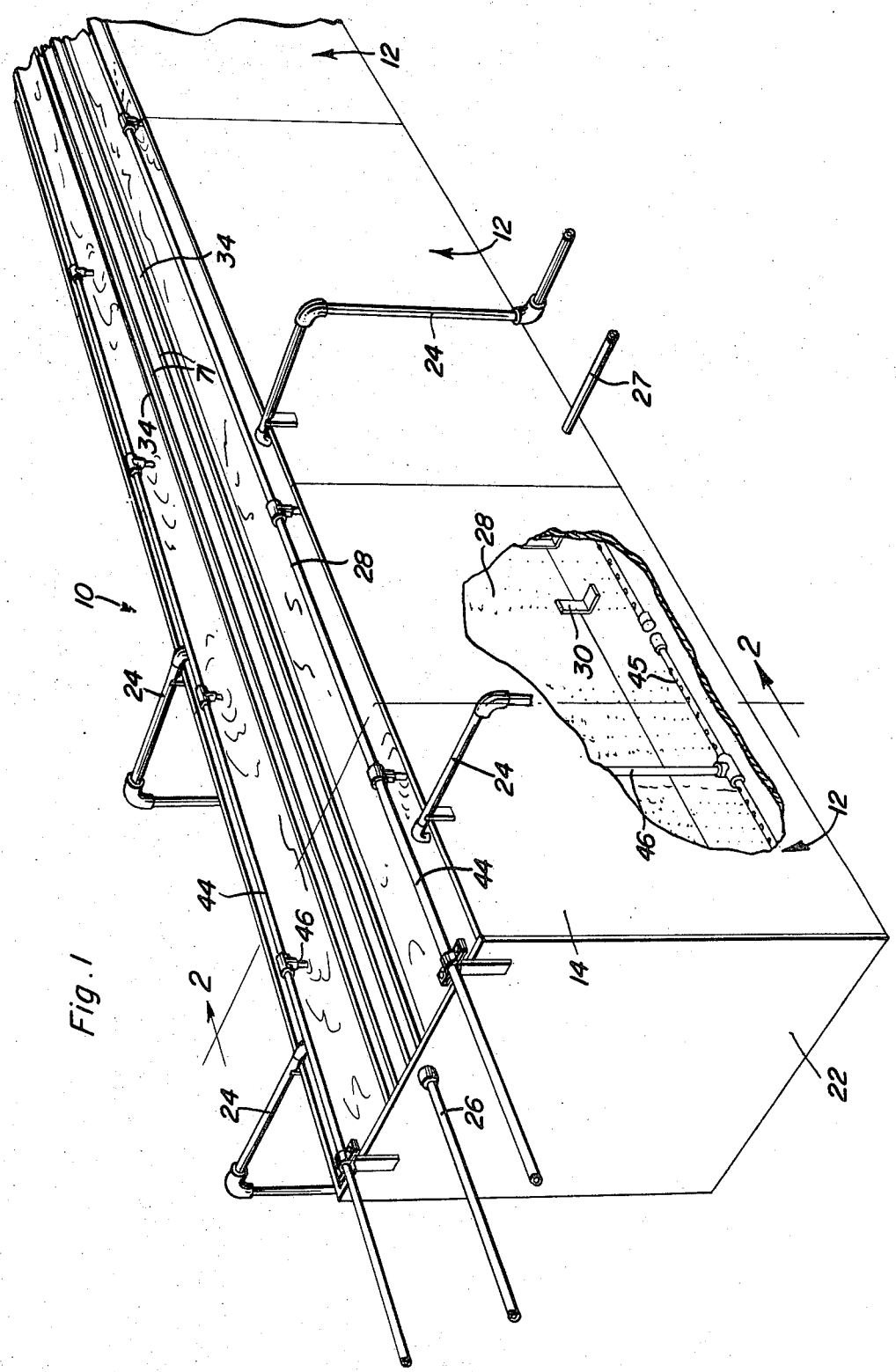
FIG. 1 is a perspective view of a wastewater treatment plant constructed in accordance with the teachings of the present invention, illustrating the modular construction contemplated by the present invention.

The improved extended aeration waste water treatment process of this invention is carried out in a wastewater treatment facility generally shown in the drawings. As can be seen from FIG. 1, a water treatment facility generally indicated at 10 is composed of two complete wastewater treatment modular units 12 and a portion of a third unit. Each modular unit 12 has a shell 14 formed by two side walls and the bottom of the main chamber, or tank. The side walls of adjacent modular units 12 are butt welded and may be reinforced. Optionally, they may be fastened together in any known convenient liquid-tight manner. End plates 22 are welded to the side walls to form a rectangular enclosure. Raw sewage enters the system by means of one or more entry pipes 24 and exits the system from exit pipe 26. Additionally mixed liquor can be periodically withdrawn from mixed liquor pipes 27.

As shown in FIG. 2, the internals of the system take the following form. A pair of vertically oriented main baffle plates 28 are substantially centrally located in and extend along the length of the shell 14. The main baffle plates 28 are maintained above the bottom of each unit 12 by a number of brackets or suitable supports 39 so that the baffle plates 28 and the bottom define restricted openings 54. A number of support rods 32 connect the respective baffle plates 28 to the side walls of the shell 14. A pair of clarifier baffle plates 34 are positioned between the main baffle plates 28 in each unit 12 and are oriented parallel to the main baffle plates. The clarifier baffle plates 34 are secured to the main baffle plates 28 by means of upper and lower supports 36, while the clarifier baffle plates are spaced apart by means of upper and lower supports 38. A pair of effluent collection weirs 40, are connected to elongated L-shaped channels 43 which, in turn, are rigidly secured to respective clarifier baffle plates 34 in each modular unit 12. A pair of scum baffles 71, extending a few inches, for Example 4, above the water surface and several inches, for Examples 6–12, below the water surface are rigidly secured to the effluent collection weirs 40 by suitable supports 72. An elongated flow developer 42, triangular in cross-section, is centrally mounted and secured to the bottom of each unit 12 and extends along the entire length thereof. A pair of conventional headers 44 are positioned on respective sides of each modular unit 12, along the top. Depending at spaced locations along the units 12, are aerators 45 or other suitable devices to generate air bubbles. A compressor, not shown, brings air to supply pipes 46 and thence to the aerators 45 via headers 44. Inlet pipe or pipes 24 introduce raw sewage into the top of the unit at one or more locations. Mixed liquor pipes 27 periodically remove mixed liquor from the unit.

In operation, raw sewage enters both sides of the system through entry pipe or pipes 24 directly into what may be called the aeration zones shown generally at 52. With each addition of raw sewage into the aeration zone 52 an equal volume of clarified supernatant is expelled from the system through exit pipe 26. That is, as the raw sewage enters the aeration zone, the liquid level rises above the walls of the effluent collection weirs 40, thereby causing liquid to flow into the respective weirs. As best seen in FIG. 3, the liquid in the respective effluent collection weirs 40 merges and flows in the direction of arrows 54, into the exit pipe 26.

Aerators 45 bubble air into aeration zones 52 producing violent turbulence due to the mechanical action of the bubbles, which in turn causes complex circulation patterns within the aeration zones 52.

With the aerators 45 introducing a supply of air into the respective aeration zones 52, the mixed liquid in the aeration zones is reduced in density. This action causes the more dense mixed liquor to flow from what may be termed the mixed liquor return zone, indicated generally at 56, through the restricted openings 54 into the aeration zones 52. This flow is indicated by arrows 58 and is directed by the flow developer 52. Because of the location and size of restricted openings 54, the liquid returning to aeration zones 52 swiftly flows across the bottom of the tank directly to near aerators 45. This substantially prevents any of the solid particles in the mixed liquor from settling out of suspension before they are again acted upon by the turbulence caused by the air from aerators 45.

Simultaneously with the flow of mixed liquor from the mixed liquor return zone to the aeration zones, an equal volume of mixed liquor flows, in the direction of arrows 60, over the respective main baffle plates 28 from the aeration zones 52 into what may be termed downcomer zones, indicated generally at 62. The mixed liquor flows in the downcomer zones 62 in the direction of arrows 64. At the lower ends of the downcome zones 62, there are two distinct flows of mixed liquor. A major portion of the mixer liquor flows downwardly in the direction of arrows 66 and into the mixed liquor return zone 56, while the remainder of the mixer liquor flow upwardly, in the direction of arrows 68, into what may be termed the clarifier zone, shown generally at 70.

In the quiescent clarifier zone 70, sludge particles settle towards the bottom of the tank, while the lighter fluid, the clarified effluent, moves to the top of the clarifier zone 70. As a result, an actual clarified effluent/mixed liquor interface forms in the clarifier zone 70 with the concentration of the sludge particles in the mixed liquor being at a maximum immediately below the interface. When raw sewage is introduced into the system, the clarified effluent flows over the collection weirs 40 and out of the system through exit pipe 26. Any scum which forms and begins to float to the liquid surface at the top of the clarifier section is effectively prevented from flowing over collection weirs 40 by scum baffles 71. As is evident from FIG. 2, the scum particles which float to the liquid surface contact slightly inclined L-shaped channels 43 so that they rise to the liquid surface between scum baffles 71. Because the effluent liquid passing out of collection weirs 40 must pass below the scum baffles 71, the scum particles are prevented from passing out of the clarifier by their own floatation.

As set forth above, in the operation of the extended aeration process, the concentration of the particulate inorganic wastes slowly builds in the continuously recycled mixed liquor. Accordingly, a small amount of mixed liquor is preferably periodically withdrawn from aeration zone 52 by mixed liquor pipes 27 and transferred to a sand filter (not shown), or other filtering or settling device, to remove the solids contained therein. As is known in the art, the solids concentration of the mixed liquor in the extended aeration process is usually maintained between about 2,000 and 6,000 mg./l. Accordingly, the frequency and the amount of mixed liquor withdrawn are selected so that the solids concentration remains substantially within this range. However, since the rate of formation of inorganic solids is so small, i.e. about 12% by weight of objectionable organic matter removed, the extended aeration process of this invention can be operated with a typical sludge for ½ year or longer before any mixed liquor is withdrawn. This represents a significant advantage over the activated sludge process in which part of the compacted sludge produced must be continually wasted.

Instead of removing mixed liquor from the system periodically, the mixed liquor can be removed continuously. However, because the total amount of mixed liquor is so small, continuous withdrawal is impractical except for relatively large plants. In any event, the amount of mixed liquor withdrawn is usually not in excess of 0.5% of the total raw sewage through-put.

A significant feature of the present invention is that no compaction of the mixed liquor or settling of the sludge particles occurs during the entire process. On the contrary, the concentration of sludge particles in the mixed liquor remains substantially constant throughout the entire volume of mixed liquor in the tank. This is accomplished according to the present invention by locating the various baffles and selecting the compressed air flow rate in such a manner that the downward velocity of the mixed liquor in the mixed liquor return zone is at least 10 times the settling velocity of the sludge particles and the velocity of the mixed liquor flowing through restricted opening 54 is at least 30 times the settling velocity of the sludge particles.

Moreover, in a preferred embodiment, the location of the baffles and the flow rate of the compressed air are selected so that the downward velocity of the mixed liquor in the mixed liquor return zone is 50 to 100 times the settling velocity of the sludge particles, and the velocity of the mixed liquor flowing through restricted opening 54 is about 100 to 400 times the settling velocity of the sludge particles. It has been found that by operating within these preferred limits, the concentration of the sludge particles in the total volume of mixed liquor remains essentially constant and settling of the sludge particles is totally eliminated.

The proper positioning of the baffles and the necessary compressed air flow rate can be selected according to the present invention by trial and error, based on the settling velocity of the sludge particles in the mixed liquor. Determination of the settling velocity of the sludge particles, of course, can be accomplished by methods well-known in the art. Alternatively, the locations of the baffles can be calculated, since the flow through orifice 54 is a function of both the size of orifice 54 and the density difference between the mixed liquor in the mixed liquor return zone and the mixed liquor in the aeration zones, and also the flow of mixed liquor through mixed liquor return zone is a function of the difference in size between the mixed liquor return zone and orifice 54.

It has been found that when the present extended aeration system is operated according to the above limitations, the mixed liquor flows relatively fast in its circuitous path from the mixed liquor return zone to the aeration zones and back again. For example, when using a typical sludge having a settling velocity of about 0.07 feet per minute, the flow velocity of mixed liquor through restricted opening 54 ranges from about 10 to 40 feet per minute, and the mixed liquor flow velocity through mixed liquor return zone 56 is about 4 to 10 feet per minute. At such conditions, the mixed liquor actually travels in its circular path from extended aeration zones 52 to mixed liquor return zone 56 and back again at mass flow rates at least about 20 times the raw sewage inlet mass flow rate. Moreover, at optimum conditions, the flow velocity through restricted opening 54 is about 16 to 25 feet per minute, while the downward flow velocity of mixed liquor through mixed liquor return zone 56 is about 5 to 8 feet per minute. At these conditions, the mixed liquor travels in its circular path from extended aeration zones 52 to mixed liquor return zone 56 and back again at mass flow rates of about 100 to 400 times the raw sewage input flow rate.

A significant feature of the prsent invention is that substantially no settling of the sludge particles occurs. This is due to the fact that in the aeration zone, the mixed liquor flowing through orifices 54 travels swiftly across the bottom of the tank. For example, operating at the preferred parameters, a typical mixed liquor flows through orifices 54 at approximately 7 to 40 feet per minute. Because of this rapid velocity, any particles which might tend to settle to the bottom of the aeration zone are immediately thrust back into suspension. In addition, flow developer 42 improves the flow velocity of mixed liquor through orifice 54. Flow developer 42 physically turns the mixed liquor flowing downward from mixed liquor zone 56 so that it flows in a more horizontal path. Thus, flow developer 42 decreases parasitic pressure losses since it smoothly directs and accelerates the liquid into the aeration tank. Moreover, flow developer 42 further prevents any sludge compaction or settling in the middle of the bottom of sludge return zone 56.

It has also been found that if the location of the baffles and the compressed air flow rate are selected to ensure the high mixed liquor flow rate as set forth above, the unwanted production of septic sludge is also substantially completely eliminated. At such high mixed liquor circular flow rates, the oxygen consuming aerobic bacteria do not remain in the mixed liquor return zone long enough to completely consume the available oxygen. For example, operating within the preferred parameters, the detention time of a given volume of mixed liquor would be roughly 1 to 2 minutes. Accordingly, the bacteria in the mixed liquor never begins anaerobic activity. Moreover, because aerobic activity does occur in the mixed liquor return zone, the volume of the mixed liquor return zone can be counted as part of the detention volume in the design of the process and apparatus for biodegradation. This results in a reduction in the size of the aeration zone compared with conventional extended aeration plants wherein only the aeration tank can be considered as treatment volume.

Because of the inclusion of the clarifier zone, the mind liquor return zone, the aeration zone, and optionally the scum removal zone in the same tank, certain benefits accrue over conventional approaches. Specifically, the entire baffling system can be preassembled or substantially assembled in the factory to allow simple assembly of individual modular units in the field. Thus, small plants (up to about 50,000 gallons per day) may be factory fabricated and transported by truck to the job site. Also, the capacity of the inventive unit is a direct function of the unit length. Once the desired width of the unit is determined (usually governed by the width allowed for truck transportation, approximately 12 feet), there is no need to redesign a clarifier for every plant size when using the inventive system. Additions to an existing plant of this design can be accomplished simply by adding the required number of units in series.

A variation of the inventive process and apparatus is described in FIG. 4 which shows the internal baffling arrangement for clarifier zone 77 and sludge return zone 78. In this arrangement, special baffles have been incorporated to provide a means of preventing scum from accumulating at the top of the clarifier zone 77. Sludge particles which rise because of entrained air bubbles (scrum), will strike deflector baffles 73 and will be forced into scum collection zones 75 formed by the clarifier baffles 74 and deflector baffles 73. The clarifier baffles, 74, are designed so that the top of each baffle is only an inch or two above the normal operating water level 79. Scum will rise in the scum collection zones 75 and will form scum cakes 80 floating on the water surface. After a sufficient height of scum has formed, the cake will become unstable and a portion will slough off into downcomer zones 81. In addition, in a preferred embodiment, air dispersion headers 67 can be provided to bubble air into scum collection zones 75 in order to lift the scum cakes over baffle 74.

Yet another variation of the inventive process is shown in FIG. 5. In this arrangement, clarifier zone 82, sludge return zone 83, and downcomer zone 81 are located along only one longitudinal side of the process tank 86. A suitable aeration device, 85, is located along the opposite side of the tank 86. A recirculation baffle 87 is placed in the same manner as previously described. A scum collection zone 91 is defined by a clarifier baffle 88 and a scum deflector baffle 90. Another scum deflector baffle 89 is located below the main scum deflector 90. The main scum deflector baffle 90 can be supported by braces 92, 95 attached to the lower scum baffle 89 and to the clarifier baffle 88. The top of the clarifier baffle 88 extends approximately one to two inches above the water level 93. The main scum deflector baffle extends several inches above the water level. Rising scum will be deflected by the main scum baffle 90 into the scum collection zone 91 and will rise to the top of the scum collection zone where it will form a scum cake 94. After a sufficient height has formed, the cake will be unstable and will fall into the downcomer zone 84. The apparatus of this embodiment can also be optionally provided with air dispersion header 67 to bubble air into scum collection zone 91 and thereby lift the scum cake 94 over baffle 88.

Figure 6:
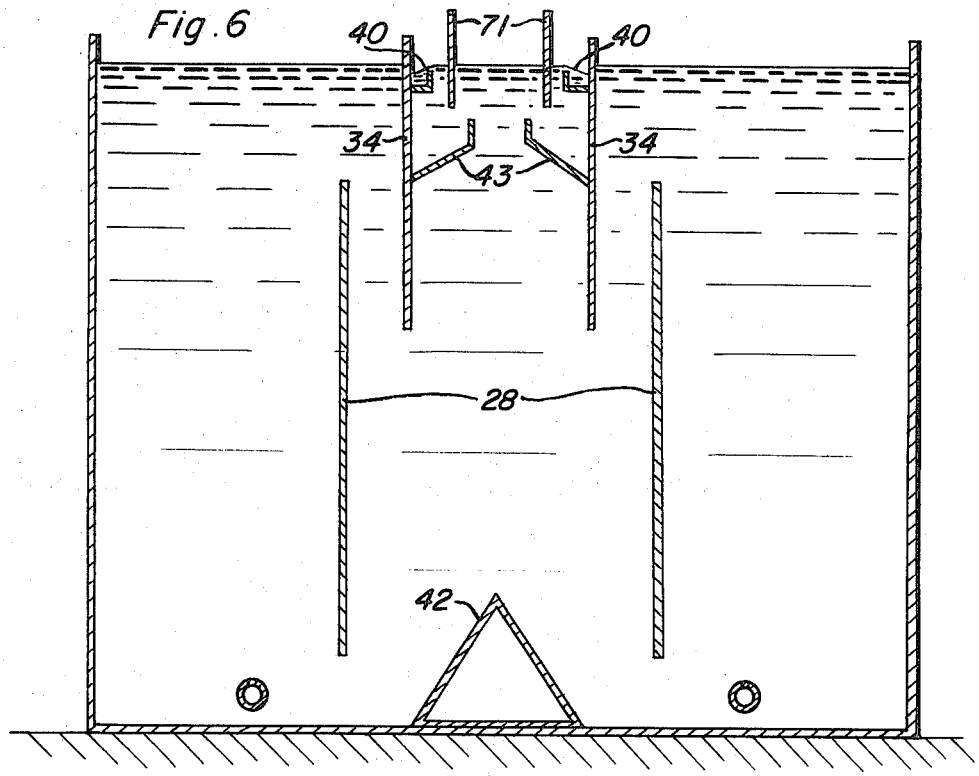
FIG. 6 is a cross-section similar to FIG. 2 showing still another modification.

A further modification is disclosed in FIG. 6 which shows a system similar to the system shown in FIG. 2. In FIG. 6, the main baffles 28, the clarifier baffles 34, the scum baffles 71, the collection weirs 40, the L-shaped collectors 43 and the flow director 42 are identical to the corresponding components of the system shown in FIG. 2. However, in FIG. 6, aerators 45 are located in close proximity to the opening formed between the bottom of main baffles 28 and the bottom of the tank. The apparatus of this figure operates in substantially the same way as the apparatus shown in FIG. 2. However, by placing the aerators 45 in close proximity to restricted opening 54, the speed of circulation of the mixed liquor around the main baffles 28 is increased.

Figure 7:
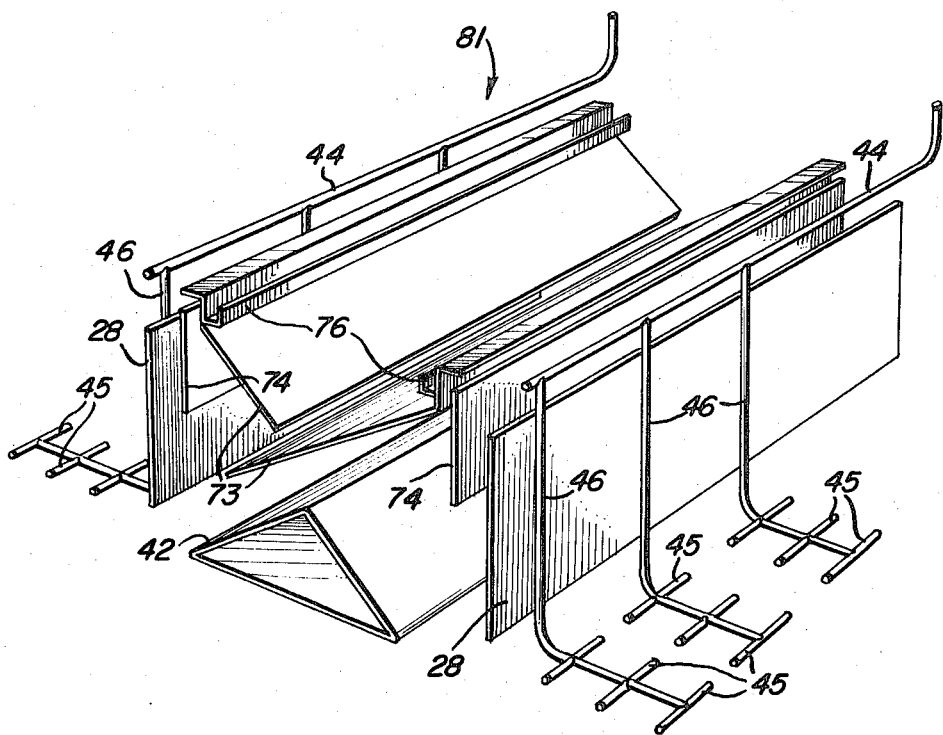
FIG. 7 is a perspective view of the internal components of the apparatus of this invention.

FIGS. 7, 8 and 9 illustrate another embodiment of the invention in which the internals of the apparatus, namely the baffling, weirs and air supply pipes, are assembled in modular form and placed in an already existing liquid-tight chamber. FIG. 7 illustrates an internal module useful for this purpose which is similar in construction to the internals of the apparatus shown in FIG. 4. The internal module of FIG. 7 is composed of main baffles 28, clarifier baffles 74, scum baffles 73, collection weirs 76 and flow developer 42. The air supply system is composed of headers 44, supply pipes 46 and aerators 45. The internals of this system are basically the same as the internals of the apparatus shown in FIG. 4, except that the single aerators 45 in FIG. 4 are replaced by multiple aerators 45 attached to air supply pipes 46, which horizontally extend out from the main baffles 28. The multiple aerators are used in this baffling system to ensure a complete mixing of the air with the mixed liquor and to therefore provide greater recirculation and a more homogenous composition.

FIG. 8 illustrates the use of the internal module of FIG. 7 in an extended aeration system according to this invention. In FIG. 8, an internal module of this invention is placed in a concrete lined earthen basin generally indicated at 101. The concrete lined earthen basin comprises a hole in the earth, generally indicated at 103, which is lined with a layer of concrete 104. Raw sewage is fed into the basin through input lines 108 and withdrawn through weirs 109.

FIG. 9 illustrates another method of using the internal module of the present invention. In this figure, an internal module, generally indicated at 100, is simply placed in a lagoon 101 containing two conventional floating aerators 102 to form a waste water treating plant. Raw waste is poured into the lagoon through raw sewage inlet pipes 108, and the entire lagoon serves as the main tank. Clarified effluent is collected in collection weirs 76 and discharged in a conventional manner. In this application, the module performs two functions. It clarifies the effluent before it is discharged, and it retains the active sludge particles in the lagoon to increase the effectiveness of the treatment process.

In the embodiments shown in FIGS. 7, 8 and 9, the internal module can be prefabricated in the factory and assembled at the plant location, and the assembled module simply lowered into a suitable liquid-tight chamber. Because of the use of an already existing chamber, it is unnecessary to build a special tank for housing the inventive baffling and aeration system of this invention. Thus, the capital outlay in building an extended aeration system according to this invention can be drastically reduced.

Some design considerations pertinent to the construction of the inventive system and the practice of the inventive process is as follows: When the clarifier is designed on the basis of smaller sewage plants, an overflow rate of 300 gallons per day per square foot of clarifier zone cross-section is used to allow for variations in flow rate. The clarifier baffle plates, which run along the entire length of the tank, should extend several inches, for example 4–6, above the maximum water level. The depth of the clarifier baffle plates should be from 4 to 7 feet below the water level for a unit having a total liquid depth on the order of 10 feet. The main baffle plates should be located at a lateral distance from the clarifier baffle plates such that the downflow velocity between the baffle plates is approximately 0.2 or more feet per second. This causes the inclusion of air bubbles in the recirculating mixed liquor and allows the bubbles to attach to lighter sludge particles, thereby carrying them to the scum collection zone, where the lighter scum particles agglomerate. The tops of the main baffle plates should be at least 4 inches below the water level and not less than 3 feet above the bottom of the clarifier baffle plates. The bottoms of the main baffle plates should be at least 2 inches from the bottom of the tank. The flow developer 42 may take several shapes, at the option of the used. The shape may be triangular, hyperbolic, or other more intricate designs. In any event, the shape should facilitate recycling of the sludge.

Because the design according to the invention is modular in concept, fabrication, in plant or on site, is greatly simplified. Moreover, the capacity of an existing plant can be increased by simply adding more units to the already operating equipment.

While the present invention has been thoroughly described above, the following example is provided to specifically illustrate the construction and operation of typical wastewater treatment plants according to the present invention.

EXAMPLE

A number of wastewater treatment plants having the configuration shown in FIG. 5 are constructed. These plants have a width of five feet, a length of 7½ feet and a height of 10 feet. The plants each contain enough mixed liquor having a sludge setting rate of about 0.07 feet/minute so that the liquid level in each plant is about 9½ feet, which corresponds to a gross liquid volume of 2,670 gallons. Excluding the volume occupied by the clarified zone and the flow developer, the effective treatment volume of each plant is approximately 2,250 gallons. In each plant, a baffle 88 is placed 1½ feet from the left wall and baffle 90 two inches from baffle 88. Baffle 88 extends about 1 inch above to 4 feet below the surface of the liquid. The main baffle 87 is located in each plant 6 inches from the baffle 88 and 3 feet from wall 86. Additionally, the extension of the top of main baffle 87 is varied in the different plants from 4 to 12 inches below the surface of the liquid, while the bottom of main baffle 87 extends down to 2 to 6 inches above the tank bottom.

Using air flows of 2 to 4 cubic feet per minute, recirculating mass flow rates of 650,000 to 1,000,000 gallons per day are measured. The corresponding mixed liquid flow velocities within the system are as follows: upward flow velocity in the aeration zone of 2.7 to 4 feet per minute; downward flow velocity in the downcomer region of 16 to 25 feet per minute; downward flow velocity in the mixed liquor return zone of 4 to 6 feet per minute; and lateral flow velocity underneath main baffle 87 of 16 to 48 feet per minute.

The various units are operated with average raw sewage inlet flow rates of 2,500 gallons per day and peak flow rates of 7,500 gallons per day. The corresponding upflow velocities in the clarified zone are about 0.015 to 0.045 feet per minute, and the corresponding clarifier overflow rates are 133 to 500 gallons per day per square foot of clarifier cross-section. The quality of the effluent and the reduction in wastes are comparable to properly operated conventional extended aeration plants.

Above, a specific example of the inventive process and apparatus has been described. It should be understood, however, that many alterations and modifications, as well as additions, may be made without departing from the spirit and scope of the invention. For example, several standard appurtenances may be added, depending upon specific plant requirements. Some of these include a bar screen, a comminutor, sewage pumps, other scum removal systems, a froth control system, a chlorinator, a sludge storage tank, sludge decant tank, and a chlorine contact chamber. Further, while the above disclosure has centered mainly on plants of rectangular design, the present invention may be applicable, without changes in design parameters, to other geometries. However, it should be understood that circular and other design forms will have the disadvantage of not being equally adapted to the modular concept nor will they have the fabrication cost advantages associated with the use of flat plates, although circular forms will make it possible to use lighter materials in certain applications, especially smaller capacity plants. Aditionally, while the inventive apparatus has been described as including specific baffling systems to separate scum from the clarified effluent, conventional scum removal equipment can also be used for this purpose.

It is the intent, therefore, that the present invention not be limited by the above, but be limited only in the light of the appended claims.

We claim:

1. An extended aeration process for the treatment of raw wastes comprising:

(1) establishing a vertically oriented closed mixed liquor flow path having an up leg, a down leg, an intercommunicating top portion, and an intercommunicating bottom portion, (2) establishing a volume of mixed liquor in said vertically oriented mixed liquor flow path, (3) establishing a quiescent zone, the bottom portion of which is open to said down leg, the top portion of fluid in said quiescent zone being a clarified effluent and the bottom portion of fluid in said quiescent zone being mixed liquor, the top and bottom portions of fluid being separated by a clarified effluent/ mixed liquor interface,
(4) adding an amount of raw wastes to the mixed liquor in said up leg,
(5) withdrawing from the quiescent zone an amount of clarified effluent equal to the amount of raw wastes added in step (4), and
(6) forcing sufficient oxygen-containing gas into the mixed liquor in said up leg so that (a) the mixed liquor is recirculated around said path at a mass flow rate at least 20 times the average mass flow rate of the incoming raw wastes, (b) mixed liquor is accelerated as it approaches the bottom of said down leg and (c) mixed liquor sweeps swiftly across said intercommunicating bottom.

2. A process according to claim 1 wherein the mixed liquor is recirculated around said path at a mass flow rate of about 100 to 400 times the average mass flow rate of incoming raw waste.

3. A process according to claim 1 wherein the downward flow velocity of mixed liquor in said down leg is at least 10 times the settling velocity of the sludge particles in the mixed liquor, and further wherein the flow velocity of the mixed liquor in said intercommunicating bottom portion is at least 30 times the settling velocity of the sludge particles in the mixed liquor.

4. A process according to claim 3 wherein the downward flow velocity of the mixed liquor in said down leg is about 50 to 100 times the settling velocity of the sludge particles in the mixed liquor, and further wherein the flow velocity of the mixed liquor in said intercommunicating bottom portion is about 100 to 400 times the settling velocity of the sludge particles in the mixed liquor zone.

5. A process according to claim 1 wherein the entire recirculation pumping of the mixed liquor in said vertically oriented closed mixed liquor flow path is provided by the oxygen containing gas forced into said aeration zone.

6. A process according to claim 1 wherein two vertically oriented closed mixed liquor flow paths are established, said flow paths having a common quiescent zone intermediate the up legs of the respective flow paths.

7. A process according to claim 1 wherein the mean residence time of a given volume of mixed liquor in said down leg is about 1 to 2 minutes.

8. A process according to claim 1 further comprising establishing within an upper portion of said quiescent zone a scum separating zone containing clarified effluent and scum; said process further characterized in that scum floats to the top of said scum separating zone and is separated from the clarified effluent before it is withdrawn.

9. A process according to claim 8 wherein said scum separating zone is intermediate an upper portion of said down leg and said quiescent zone; and said process is further characterized in that scum which floats to the surface of the clarified effluent in said scum separating zone is automatically returned to the mixed liquor return zone.

10. A process according to claim 9 wherein said scum separating zone is immediately adjacent the upper portion of said down leg, and scum floating on the clarified effluent in the scum separating zone forms a compacted cake which rises above the upper surface of the mixed liquor in the mixed liquor return zone, and after a sufficient build up of scrum cake, the scum cake falls into the mixed liquor return zone.

11. An apparatus for the extended aeration treatment of raw wastes comprising a main liquid-tight housing containing a quantity of liquid; a first baffle substantially vertically positioned within said liquid-tight housing, the top of said first baffle extending to below the surface of said liquid and the bottom of said baffle forming a retricted opening with the bottom of said liquid-tight housing, said first baffle defining within said housing an aeration zone for containing mixed liquor and a mixed liquor return zone for containing mixed liquor; a second baffle substantially vertically positioned within said mixed liquor return zone and spaced a distance away from said first baffle, said second baffle defining a clarifier zone for containing clarified supernatant, the top of said second baffle extending above the surface of both the mixed liquor and the clarified supernatant, and the bottom of said second baffle extending a predetermined distance below the surface of the mixed liquor and the clarified supernatant; means to supply a quantity of oxygen-containing gas to said aeration zone in order to reduce the density of the mixed liquor therein; means for introducing a volume of raw wastes to said aeration zone; and means for removing a volume of clarified supernatant from said clarifier zone equal to the volume of raw wastes introduced into said aeration zone; said apparatus further characterized in that the size of said restricted opening, the distance between said first and second baffles and the size of said means for supplying a quantity of oxygen-containing gas are selected and spacially interrelated so that the mixed liquor in the liquid-tight housing can be made to repeatedly recirculate from the aeration zone to the mixed liquor return zone and back again at mass flow rates at least 20 times the mass flow rate of the incoming raw wastes.

12. Apparatus according to claim 11 wherein the size of said restricted opening, the distance between said first and second baffles and the size of said means for supplying a quantity of oxygen-containing gas are selected and spacially interrelated so that the mixed liquor in the liquid-tight housing can be made to repeatedly recirculate from the aeration zone to the mixed liquor return zone and back again at mass flow rates about 100 to 400 times the mass flow rate of the incoming raw wastes.

13. Apparatus according to claim 11 wherein the size of said restricted opening, the distance between said first and second baffles and the size of said means for supplying a quantity of oxygen-containing gas are selected and spacially interrelated so that the mixed liquor in the liquid-tight housing can be made to repeatedly recirculate from the aeration zone to the mixed liquor return zone and back again at flow rates so fast that
 (a) the downward flow velocity of the fluid in the mixed liquor return zone is at least 10 times the settling velocity of the sludge particles in the mixed liquor and
 (b) the flow velocity of the mixed liquor flowing from said mixed liquor return zone to said aeration zone is at least 30 times the settling velocity of the sludge particles in the mixed liquor.

14. Apparatus according to claim 13 wherein the size of said restricted opening, the distance between said first and second baffles and the size of said means for supplying a quantity of oxygen-containing gas are selected and spacially interrelated so that the mixed liquor in the main liquid-tight housing can be made to repeatedly recirculate from the aeration zone to the mixed liquor return zone and back again at mass flow rates so fast that
 (a) the downward velocity of the fluid in the mixed liquor return zone is about 50 to 100 times the settling velocity of the sludge particles in the mixed liquor and
 (b) the flow velocity of the mixed liquor flowing from said mixed liquor return zone to said aeration zone is about 100 to 400 times the settling velocity of the sludge particles in the mixed liquor.

15. Apparatus according to claim 11 further comprising means to direct the downward flowing fluid in the mixed liquor return zone through said restricted opening and across the bottom of said aeration zone.

16. Apparatus according to claim 11 further comprising two first baffles defining two aeration zones and an intermediate single, common mixed liquor return zone; and two second baffles defining the clarifier zone within said intermediate mixed liquor return zone.

17. Apparatus according to claim 16 further comprising means to direct the downward flowing fluid in the mixed liquor return zone to the restricted openings formed between said first baffles and the bottom of said liquid-tight housing and across the bottoms of the respective aeration zones.

18. Apparatus according to claim 11 further comprising means to separate floating scum from the clarified effluent.

19. Apparatus according to claim 18 wherein the means to separate floating scum from the clarified effluent comprises: a third substantially vertical baffle extending above and below the fluid surface in the clarifier zone, and positioned so that the clarified effluent is withdrawn on one side of the third substantially vertical baffle; and an inclined baffle located below said third substantially vertical baffle and positioned to cause rising scum to float to the clarified effluent fluid surface in the clarifier zone on the opposite side of the third substantially vertical baffle.

20. Apparatus according to claim 19 further comprising two first baffles defining two aeration zones and an intermediate mixed liquor zone; two second baffles defining a clarifier zone within said intermediate mixed liquor return zone; two third substantially vertical baffles positioned in said clarifier zone so that they define a single common scum separating zone; and two inclined baffles positioned to cause rising scum to float to the clarified effluent fluid surface in the common single scum separating zone.

21. Apparatus according to claim 19 wherein said third substantially vertical baffle is spaced away from said second baffle so that said second baffle and said third substantially vertical baffle define a scum separating zone, said third substantially vertical baffle extending above the fluid surface to a substantially greater distance than the top of said second baffle so that scum which accumulates in said scum separating zone automatically falls into said mixed liquor return zone.

22. An apparatus according to claim 21 further comprising two first baffles defining two aeration zones and an intermediate mixed liquor return zone; two second baffles defining a common clarifier zone; two third substantially vertical baffles defining a common effluent discharge zone and two separate scum removing zones; and two inclined baffles, one of said inclined baffles associating with one of said third substantially vertical baffles to cause rising scum to float to the clarified effluent fluid surface in one scum removing zone, and the other inclined baffle associating with the other third substantially vertical baffle to cause rising scum to float to the clarified effluent fluid surface in the other scum removing zone, said two inclined baffles positioned so that each is out of contact with the other and further so that they overlap in at least one common vertical plane.

23. Apparatus for the purpose of carrying out an extended aeration treatment of raw wastes which is to be placed in an already existing liquid-tight housing containing a quantity of liquid and having means to supply a quantity of incoming raw wastes to said liquid-tight housing, said apparatus comprising: two main baffles, said main baffles being substantially vertical and substantially parallel, the top of each main baffle extending to below the surface of the liquid contained in the liquid-tight housing and the bottom of each main baffle forming a restricted opening with the bottom of the liquid-tight housing when said main baffles are placed in said liquid-tight housing, said main baffles further characterized in that they define at least two aeration zones for containing mixed liquor and an intermediate mixed liquor return zone for containing mixed liquor; a pair of clarifier baffles, each clarifier baffle being substantially parallel to a corresponding main baffle, and each clarifier baffle being spaced a distance away from its corresponding main baffle, said clarifier baffles defining within said intermediate mixed liquor return zone a clarifier zone for containing clarified supernatant, said clarifier baffles further characterized in that when placed in said liquid-tight housing, the top of each clarifier baffle extends above the surface of the liquid in said liquid-tight housing and the bottom of each clarifier baffle extends a predetermined distance below the surface of the liquid in said liquid-tight housing; means to supply a quantity of oxygen-containing gas to said aeration zone in order to reduce the density of the mixed liquor therein; and means for removing a volume of clarified supernatant from said clarifier zone equal to the volume of raw wastes introduced in said aeration zone; said apparatus further characterized in that the size of said restricted openings, the distance between the corresponding main and clarifier baffles and the size of said means for supplying a quantity of oxygen-containing gas are selected and spacially interrelated so that the mixed liquor in the liquid-tight housing can be made to repeatedly recirculate from the aeration zone to the mixed liquor return zone and back again at mass flow rates at least 20 times the mass flow rate of the incoming raw wastes.

24. Apparatus according to claim 23 wherein the size of said restricted opening, the distance between the corresponding main and clarifier baffles and the size of said means for supplying a quantity of oxygen-containing gas are selected and spacially interrelated so that the mixed liquor in the liquid-tight housing can be made to repeatedly recirculate from the aeration zone to the mixed liquor return zone at mass flow rates about 100 to 400 times the mass flow rate of the incoming raw wastes.

25. Apparatus according to claim 24 further comprising means to direct the downward flowing fluid in the mixed liquor return zone to said restricted openings and across the bottoms of said respective aeration zones.

26. Apparatus according to claim 25 further comprising means to separate floating scum from the clarified effluent.

27. Apparatus according to claim 26 wherein the means to separate floating scum from the clarified effluent comprises: a pair of scum separating baffles, each scum separating baffle being substantially parallel to a corresponding clarifier baffle and each scum separating baffle extending above and below the fluid surface in the clarifier zone, said scum separating baffles defining two independent scum separating zones and an intermediate clarifier zone; and two inclined baffles, one of said inclined baffles associating with one of said scum separating baffles to cause rising scum to float to the clarified effluent surface in one of said scum removing zones, and the other inclined baffle associating with the other scum separating baffle to cause rising scum to float to the clarified effluent surface in the other scum removing zone, said two inclined baffles positioned so that each is out of contact with the other and further so that they overlap in at least one common vertical plane.

28. Apparatus according to claim 27, wherein clarified effluent is removed from said clarifier zone by means of at least two weirs.

References Cited

UNITED STATES PATENTS

| 2,597,802 | 5/1952 | Kappe | 210—197 |
| 2,574,685 | 11/1951 | Baxter et al. | 210—195 |
| 3,385,444 | 5/1968 | Dufournet | 210—195 |
| 3,560,376 | 2/1971 | Heil | 210—7 |

MICHAEL ROGERS, Primary Examiner

U.S. Cl. X.R.

210—13, 14, 197, 221, 256, 537